Patented May 11, 1954

2,678,306

UNITED STATES PATENT OFFICE 2,678,306

CARBOXYSULFONIC CATION-EXCHANGE RESINS

Arthur F. Ferris, Moorestown, N. J., assignor to Rohm & Haas Company, Philadelphia, Pa., a corporation of Delaware No Drawing. Application November 28, 1951, Serial No. 258,741

7 Claims. (Cl. 260—2.2)

This invention relates to cation-exchange resins which contain as their polar, functional, cation-adsorbing groups both carboxyl groups and sulfonic acid groups. It also relates to methods of preparing such cation-exchange resins.

By virtue of containing both sulfonic and carboxyl groups the products of this invention are more efficient in many commercial applications than those synthetic, organic cation-exchange resins which contain only sulfonic groups or only carboxyl groups. Thus, they have very rapid rates of exchanging ions, high capacities, and particularly efficient regenerative properties.

The cation-exchange resins to which this invention relates are made in a variety of ways but in all cases the products are alike insofar as their utility and their chemical structure are concerned. In the first place the products are insoluble, cross-linked copolymers. Secondly, all of the copolymers contain copolymerized units of (a) acrylic and/or methacrylic acids, (b) a monovinyl hydrocarbon, preferably styrene and/or vinyltoluene, and (c) a polyvinyl hydrocarbon cross-linking agent, preferably divinylbenzene.

One method of preparing such materials comprises copolymerizing a mixture of (a) styrene and/or vinyltoluene, (b) acrylic and/or methacrylic acid, and (c) a polyvinyl hydrocarbon, preferably divinylbenzene and then directly sulfonating the copolymer in the manner described below.

Another method comprises sulfonating a copolymer of (a) acrylonitrile, methacrylonitrile, acrylamide, or methacrylamide, (b) a monovinyl hydrocarbon, and (c) a polyvinyl hydrocarbon and hydrolyzing the nitrile or amide groups in the resultant copolymer to carboxyl groups. Here, however, the nitrile groups are relatively resistant to hydrolysis. Alternatively, the copolymer is first hydrolyzed and then sulfonated.

A third procedure involves first hydrolyzing a copolymer of (a) an ester of acrylic or methacrylic acid, (b) a monovinyl hydrocarbon, and (c) a polyvinyl hydrocarbon and thereafter sulfonating the resultant copolymer containing carboxyl groups.

The method which is much preferred and which is, therefore, described in more detail below comprises sulfonating a copolymer of (a) an ester of acrylic and/or an ester of methacrylic acid, (b) styrene and/or vinyltoluene, and (c) a polyvinyl cross-linking agent preferably divinylbenzene and thereafter converting the ester groups to carboxyl groups.

Similar resins can be made by sulfonating and hydrolyzing, where necessary, insoluble, cross-linked copolymers which contain the same acrylic or methacrylic compound and the same polyvinyl cross-linking agents but which do not contain styrene or vinyltoluene. Since, however, they are structurally different and are prepared under different conditions, they are the subject of another application, Serial No. 258,742, filed November 28, 1951.

The monomeric esters, which like acrylic acid, methacrylic acid, acrylonitrile, methacrylonitrile, acrylamide, and methacrylamide are copolymerized with the styrene and/or vinyltoluene and with the cross-linking agent, are the esters of acrylic or methacrylic acid and alcohols in general—particularly aliphatic monohydric or polyhydric alcohols. Since, however, the ester groups are eventually converted to carboxyl groups, with the splitting off of the alcohol, there does not appear to be any advantage in using any but the simple esters of the lower alkanols containing one to about four carbon atoms, such as the esters of methanol, ethanol, the propanols or the butanols. The esters of acrylic acid are preferred over the esters of methacrylic acid.

Mixtures of styrene and vinyltoluene can be used to form the copolymers in the same way as the individual hydrocarbons. Likewise, mixtures of the isomeric vinyltoluenes are operable; and accordingly the term "vinyltoluene" is used generically herein just as it is used commercially to embrace all of the isomers having the formula $CH_3$—$C_6H_4$—$CH=CH_2$. As is evident from the examples below, other monovinyl hydrocarbons such as ethylstyrene can also be employed in the preparation of the copolymer.

The relative amounts of the monovinyl hydrocarbon in the copolymers which are sulfonated can be varied over wide limits. But the object of this invention is to prepare cation-exchange resins which are unique because they contain both carboxyl groups and sulfonic acid groups and consequently it is necessary to regulate the ratios of the constituents of the copolymers. The optimal ratios of the acrylic or methacrylic acid compounds to the monovinyl hydrocarbons are from a ratio of 5:5 to the ratio 3:7. That is, the copolymers which are best employed are those containing about one to two mols of copolymerized styrene or vinyltoluene for every mol of the copolymerized acrylic or methacrylic acid compound.

The copolymers in all cases must be insoluble and cross-linked. Cross-linking and insolubility are attained by including a copolymerizable, cross-linking agent in the mixture of monomeric hydrocarbon and acrylic or methacrylic acid compound to be copolymerized. Cross-linking agents are well-known and embrace those compounds which contain a plurality of non-conjugated vinylidene groups, CH₂=C<. Currently, divinylbenzene is the most common cross-linking agent but other polyvinyl hydrocarbons are operable such as trivinylbenzene, divinylnaphthalene, trivinylnaphthalene, and polyvinylanthracenes.

By varying the amount of cross-linking agent used in the preparation of the copolymers, variations can be made in the physical properties of the polymeric materials which carry through to the finished products. Thus, for example, higher amounts of the cross-linking agent make for products of higher density. The aromatic nuclei of the polyvinyl hydrocarbons are also subject to sulfonation but the chief function of the polyvinyl hydrocarbon is to cross-link the copolymers and thereby impart insolubility. While the amount of the cross-linker can vary from one molar percent to forty molar percent; i. e., from 1–40% of all the copolymerizable monomers on a molar basis, it is advantageous to restrict the amount of this constituent of the copolymers to about 3 to 15 molar percent.

The copolymers can be formed by the known polymerization processes such as polymerization in mass, or in solvents for the monomeric materials, or in emulsion or suspension in a liquid which is not a solvent for the monomers. The last is the preferred method because it produces the copolymer in the form of small spheroids or beads, the size of which can be regulated.

The copolymerization is accelerated by means of well-recognized catalysts including ozone; ozonides; organic peroxidic compounds such as acetyl peroxide, lauroyl peroxide, stearoyl peroxide, tert.-butyl hydroperoxide, benzoyl peroxide, di-tert.-butyl peroxide; inorganic agents such as barium peroxide, sodium peroxide, and hydrogen peroxide; and the so-called "per salts" which are exemplified by perborates, persulfates, and perchlorates. The catalysts are employed in suitable amounts ranging from 0.1% to about 2.0% based on the total weight of the monomeric materials to be polymerized.

Although it is not necessary, it is nevertheless desirable to swell the particles of copolymer prior to their being sulfonated. Swelling makes the particles more susceptible to sulfonation and is accomplished by immersing the resinous particles in cold or hot organic liquids which are solvents for polystyrene. Suitable liquids include toluene, acetone, ethylene dichloride, trichloroethylene, and perchloroethylene. Any reasonable amount of swelling liquid can be used since it is easily removed before or after the sulfonation step.

The particles of resin, preferably in the wet and swollen condition, are sulfonated by reaction with a sulfonating agent such as concentrated sulfuric acid, fuming sulfuric acid, or chlorosulfonic acid. An excess of the sulfonating agent is ordinarily used. A large excess of sulfuric acid is recommended so as to provide a readily stirrable mixture. A fifty percent excess over the stoichiometric amount of chlorosulfonic acid is usually enough to insure the addition of one sulfonic acid group for each carboxyl group in the macromolecules. Particularly when chlorosulfonic acid is employed, it is suggested that an organic liquid be employed in order to facilitate stirring. Primarily for the sake of economy, the liquid should be inert toward the sulfonating agent and accordingly a chlorinated aliphatic hydrocarbon such as ethylene dichloride or perchloroethylene is recommended.

It has been found that a loss of carboxyl groups ordinarily occurs during the sulfonation of the copolymers. Just how decarboxylation takes place is not thoroughly understood but it is believed that the sulfonating agent causes a ringclosure within the molecules, involving the carbonyl groups. The net effect in any case is that the loss of carboxyl groups is attendant upon the introduction of sulfonic groups. Consequently the conditions of sulfonation are critical and must be so controlled as to insure the introduction of sulfonic acid groups while at the same time limiting the loss of carboxyl groups. Decarboxylation takes place to a greater extent in the case of the acid-copolymers than in the case of the ester-copolymers.

The temperature during sulfonation is a most important factor. While temperatures from 0° C. to 60° C. can be and have been used, those from about 20° C. to about 45° C. are much preferred. Sulfonation occurs fairly rapidly in this range in contrast with the sulfonation of cross-linked polystyrene per se or the sulfonation of the cross-linked esters themselves which require much higher temperatures. Below room temperature the rate of sulfonation of the copolymers is unnecessarily slow while above 45° C. the loss of carboxyl groups increases rapidly until at 60° C. the loss may be fifty percent or more.

Sulfonic acid groups become attached to the aromatic nuclei of the copolymer. But it should also be noted that sulfonation of the aliphatic portion of the macromolecule also occurs. The resins which have the best combination of properties for commercial utilization are those containing on the average from about 0.75 to about 4 sulfonic acid groups per carboxyl group, and such products are readily prepared under the conditions set forth herein.

Hydrolysis of the ester groups in all of the sulfonated copolymers to carboxyl groups is accomplished readily, even though polymers of methacrylic acid esters per se are notoriously resistant to hydrolysis. The sulfonation step clearly affects the ester groups as evidenced by the fact that many of them are hydrolyzed practically immediately when the sulfonation mixture is merely quenched or diluted with water. Any ester groups which are not hydrolyzed in this way can be changed to carboxyl groups by heating the diluted sulfonation mixture. Alternatively, the sulfonated particles of resin are drained free of the sulfonation agent and then, with or without washing, they are heated in water, or in an aqueous solution of an acid such as sulfuric acid or hydrochloric acid, or in an aqueous solution of an alkaline material such as sodium or potassium hydroxide. This last procedure is recommended for the hydrolysis of the copolymers of the nitriles and the amides described above.

The resin after sulfonation and hydrolysis is washed free of contaminants and is ready for use in ion-exchange operations. Since the resin is especially efficient in the hydrogen form, it is converted into that form, if necessary, by treating it with an aqueous solution of a strong mineral acid such as sulfuric acid or hydrochloric acid and then washing it with water.

When the resins are employed in ion-exchange operations, the hydrogen atoms of the functional sulphonic acid groups, —SO₃H, and of the functional carboxyl groups, —COOH, are exchanged for the cations in the fluids being treated. Thus, the functional groups are changed to metal sulfonate and metal carboxylate groups which, however, are regenerated or restored to sulfonic acid and carboxyl groups by treatment of the resin with an acid such as sulfuric acid.

This invention is further illustrated by the following examples in which all parts are by weight.

*Example 1*

A. *Preparation of copolymer.*—Into a five-liter, three-necked flask equipped with mechanical stirrer, thermometer, and reflux condenser was charged a solution of 0.1 part of gelatin and 14 parts of a commercial dispersing agent in 1600 parts of water. To this stirred solution was added a mixture of 416 parts of styrene, 200 parts of ethyl acrylate, 6 parts of benzoyl peroxide, and 137 parts of a 55% commercial solution of divinylbenzene in ethylstyrene. The stirred mixture, containing the droplets of copolymerizable materials dispersed in the aqueous medium, was heated to 75° C. and was maintained at 75°–80° C. for three hours. It was then cooled and filtered and the hard spheroids of copolymer were thoroughly washed with water and were further heated and dried at 110° C. for 16 hours.

B. *Sulfonation of copolymer.*—Into a flask equipped with stirrer, thermometer, and reflux condenser were charged 200 parts of the copolymer prepared in Step A above and 940 parts of ethylene dichloride. The mixture was stirred for 30 minutes at room temperature during which time the spheroids became swollen. Then the stirred mixture was cooled to 10° C. and to it was added over a period of 15 minutes 327 parts of chlorosulfonic acid. The temperature was held below 25° C. during the addition of the acid. The mixture was then heated to 40° C. and was stirred at 40°–45° C. for four hours. (An alternative method, involving heating for seven hours at 28°–32° C., has also been used equally effectively.)

C. *Hydrolysis.*—The product of Step B was cooled to 15° C. and then maintained at 15°–25° C. while to it was added 327 parts of water over a period of about one-half hour. The condenser was then set for conventional distillation and the mixture was warmed in order to steam out the ethylene dichloride. When about 95% of the ethylene dichloride had been removed, another portion of 400 parts of water was added to the contents of the flask and heating was continued until the removal of the ethylene dichloride was complete. The condenser was then set for refluxing and the mixture was refluxed for six hours in order to complete the hydrolysis. The spheroidal particles were removed by filtration and washed free of acid with water.

The product containing both sulfonic acid groups and carboxyl groups was tested as follows: A 10% aqueous solution of sodium chloride was slowly passed through a layer of the resin and the amount of hydrochloric acid formed by exchange of hydrogen atoms of the sulfonic acid groups for sodium ions in solution was determined. The resin was found to have a capacity, due to the presence of the sulfonic acid groups alone, of 4.0 milliequivalents per gram. Another portion of the resin was immersed in a known volume of a standard solution of sodium hydroxide for 16 hours and the alkali was then back-titrated with standard hydrochloric acid. The total capacity of the resin was thus found to be 5.45 milliequivalents/gram. Hence, the capacity due to the carboxyl groups alone was 1.45 milliequivalents/gram.

*Example 2*

Two hundred parts of the spheroidal particles of the copolymer prepared by the process of Step A of Example 1 above were soaked in 732 parts of trichloroethylene for 15 minutes and then separated by filtration. The filtered swollen particles retained 322 parts of the trichloroethylene. They were placed in a flask equipped with stirrer, thermometer, and reflux condenser and were stirred at 20°–25° C. while 1100 parts of sulfuric acid were added over a period of one hour. The mixture was then warmed to 40° C. and was stirred at 39°–42° C. for four hours, after which it was cooled to 15° C. and was held below 40° C. during the addition of 1160 parts of water. This mixture was warmed in order to distil out the trichloroethylene and was finally heated at refluxing temperature for 20 hours in order to complete the hydrolysis. The resinous product, after being cooled and washed, had a capacity due to its sulfonic acid groups of 4.06 milliequivalents/gram and a capacity due to its carboxyl groups of 1.20 milliequivalents/gram.

Similar results were obtained when ethylene dichloride was used in place of the trichloroethylene.

*Example 3*

An insoluble cross-linked copolymer of styrene, ethylacrylate, divinylbenzene and ethylstyrene, containing an equimolar ratio of styrene and ethylacrylate and 4% on a molar basis of divinylbenzene and about 3.5% on a molar basis of ethylstyrene, was made by the process described in Step A of Example 1 above.

Fifty parts of the resultant spheroidal particles were stirred in 250 parts of ethylene dichloride for 30 minutes at room temperature. Then 113 parts of chlorosulfonic acid were added over a period of one hour while the mixture was stirred and maintained at a temperature from about 15° C. to 22° C. Thereafter the mixture was stirred at 20°–22° C. for five hours. The resinous particles were removed by filtration and were placed in 750 parts of ice-water. After hydrolysis was substantially complete, as evidenced by a change in color of the beads from red to yellow, the water was decanted and steam was passed through the beads for two hours until the odor of ethylene dichloride could not be detected in the distillate. The dried particles of resin had a sulfonic capacity of 3.27 milliequivalents/gram and a carboxylic capacity of 2.73 milliequivalents/gram.

A portion of the product was refluxed for four hours in a 10% solution of sodium hydroxide and was thereby thoroughly hydrolyzed. As a result of this treatment the product, after being converted to the hydrogen form by treatment with an excess of concentrated hydrochloric acid followed by washing, had a sulfonic capacity of 3.30 milliequivalents/gram and a carboxylic capacity of 3.24 milliequivalents/gram.

When the same general procedure was followed except that the sulfonation was conducted for varying lengths of time at various temperatures, the following results, in which capacities are expressed as milliequivalents/gram, were obtained:

| Temperature | Time in Hours | Sulfonic Capacity | Carboxylic Capacity |
|---|---|---|---|
| −7° to 0° C | 6.2 | 2.71 | 3.53 |
| 37° to 42° C | 4 | 3.74 | 2.69 |
| 57° to 61° C | 2.5 | 4.92 | 1.54 |
| 79° to 83° C | 3 | 4.91 | 1.41 |

Example 4

A copolymer was prepared from equimolar amounts of styrene and n-butylacrylate and 4.6% on a molar basis of divinylbenzene and approximately 3% on a molar basis of ethylstyrene. Thus, a mixture of 312 parts of styrene, 384 parts of n-butylacrylate, 8 parts of benzoyl peroxide, and 65 parts of commercial divinylbenzene (59.1% in ethylstyrene) was copolymerized by the process of Step A of Example 1 above. The beads of copolymer were then sulfonated at 27°–30° C. for two hours and hydrolyzed by the general procedure described in Example 3. The final product had a sulfonic capacity of 3.18 milliequivalents/gram and a carboxylic capacity of 3.15 milliequivalents/gram.

Example 5

A copolymer was prepared from equimolar amounts of styrene and methyl methacrylate and approximately 4% on a molar basis of divinylbenzene and 3% on a molar basis of ethylstyrene. Thus, a mixture of 312 parts of styrene, 300 parts of methyl methacrylate, 6.5 parts of benzoyl peroxide, and 56.5 parts of commercial divinylbenzene (59.1% in ethylstyrene) was copolymerized by the process which is described in Step A of Example 1 above. The beads of copolymer were then sulfonated at 23°–28° C. for 12 hours in the presence of ethylene dichloride and were also hydrolyzed by the general procedure described in Example 3. The final product had a sulfonic capacity of 3.31 milliequivalents/gram and a carboxylic capacity of 1.76 milliequivalents/gram.

Example 6

A copolymer was prepared from equimolar amounts of styrene and acrylonitrile and approximately 6.5% on a molar basis of divinylbenzene and 6% on a molar basis of ethylstyrene. Thus, a mixture of 312 parts of styrene, 159.2 parts of acrylonitrile, 109.7 parts of a 53% solution of divinylbenzene in ethylstyrene was copolymerized by the process of Step A of Example 1 above. The beads of copolymer were then sulfonated with chlorosulfonic acid at 40°–45° C. for 5.5 hours in the presence of ethylene dichloride by the general procedure described in Example 3. At the end of the sulfonation reaction the particles of resin were separated by filtration and were added to a solution of 240 parts of sodium hydroxide in 1000 parts of water. The mixture was heated and the ethylene dichloride was steamed out. Thereafter the mixture was heated at refluxing temperature for 23 hours. The beads were then filtered off, were washed with water, and were finally washed with 2000 parts of 10% hydrochloric acid which converted the functional groups to acid groups. The washed product had a sulfonic capacity of 3.84 milliequivalents/gram and a carboxylic capacity of 1.64 milliequivalents/gram.

A similar resin was made in the same way except that the original copolymerizable mixture contained only 3.5% on a molar basis of divinylbenzene. It had a sulfonic capacity and a carboxylic capacity of 3.86 and 1.91 milliequivalents/gram respectively.

Example 7

A mixture of 260 parts of styrene, 215 parts of methacrylic acid, 51 parts of a 53% commercial solution of divinylbenzene in ethylstyrene, and 5 parts of benzoyl peroxide was polymerized in bulk at 70° C. for 20 hours. The product was granulated and was then heated with 4000 parts of a 5% aqueous solution of sodium hydroxide for 1.5 hours at 80° C. after which it was thoroughly washed with water and was dried at 110° C. This copolymer had a capacity of 1.36 milliequivalents/gram due to the presence of carboxyl groups.

Into a three-necked flask equipped with mechanical stirrer, reflux condenser, and thermometer were charged 185 parts of the granulated copolymer and 1000 parts of ethylene dichloride. The mixture was stirred for 20 minutes during which time the granules became swollen. Then 332 parts of chlorosulfonic acid were added and the mixture was maintained at 40°–45° C. for four hours. The reaction mixture was then poured into ice-water. All of the ethylene dichloride was removed by steam distillation and the filtered granules were thoroughly washed with water. The product had a capacity of 1.92 milliequivalents/gram due to the presence of the sulfonic acid groups and a carboxylic capacity of 0.59 milliequivalent/gram.

It should be noted that the ion-exchange resins which are made from the copolymerized esters of acrylic and methacrylic acids, as demonstrated in the earlier examples, are much preferred over those made from the copolymers of the acids per se because the former have much higher cation-adsorbing capacity and are much more efficiently prepared. The extent of dicarboxylation during the sulfonation step is much higher in the case of the acid copolymers than in the case of the ester copolymers.

Example 8

A styrene-acrylic acid copolymer was prepared by hydrolyzing an equimolar copolymer of styrene and ethylacrylate prepared by the first step in the process of Example 3 above. The beads of copolymer were hydrolyzed as follows:

Into a three-necked flask equipped with stirrer, thermometer, and reflux condenser were charged 400 parts of ethyl alcohol and 40 parts of sodium hydroxide. After the sodium hydroxide had dissolved, 100 parts of the cross-linked styrene-ethylacrylate beads were added and the mixture was heated at refluxing temperature for 25 hours. The beads of resin were then separated by filtration, were washed with water, and were then treated with 1000 parts of 10% hydrochloric acid. The product after being further washed with water and dried had a capacity, due to the carboxyl groups, of 4.77 milliequivalents/gram.

Fifty parts of the resin were then swollen in 250 parts of ethylene dichloride and to the mixture were added 90.5 parts of chlorosulfonic acid at 12°–15° C. The temperature was raised to 38°–42° C. and was held there for four hours. Then 82 parts of water were added dropwise over a period of 25 minutes while the temperature was maintained at 15°–25° C. Two hundred parts of water were added, the mixture was then warmed, and the ethylene dichloride distilled out. The beads of resin were removed by filtration and were washed thoroughly. The sulfonic capacity of the product was 2.91 milliequivalents/gram and the carboxylic capacity was 0.94 milliequivalent/gram.

Several methods have been described above for producing the carboxysulfonic cation-exchange resins of this invention. All of the procedures involve sulfonation. Most of them also involve hydrolysis. But regardless of the procedural steps or their sequence, the product in every case is an insoluble, cross-linked, cation-exchange resin containing both sulfonic and carboxyl groups. In reality the product is a sulfonated copolymer of acrylic acid and/or methacrylic acid, a monovinyl hydrocarbon preferably styrene and/or vinyltoluene, and a cross-linking polyvinyl hydrocarbon preferably divinylbenzene, in which copolymer the ratio of sulfonic groups to carboxyl groups is from 0.75 to 4 of the former to one of the latter.

The products of this invention perform very efficiently and economically in commercial ion-exchange operations. When capacity and rates of adsorption are considered, these resins have all of the advantages associated with the sulfonic type of exchanger. And yet they are regenerated just about as easily as the carboxylic type of exchanger, despite the presence of the sulfonic groups. Dilute acids can be used in their regeneration and only the theoretical amount—or a very slight excess—of the regenerant is required for thorough regeneration. Because very dilute sulfuric acid can be used for this purpose, there is no difficulty with precipitated calcium sulfate within the beds of the ion-exchange resins. Thus, these carboxysulfonic resins have the desirable properties of both the conventional sulfonic and carboxylic cation-exchange resins without the undesirable properties of either type. And it is to be noted furthermore that they have much better ion-adsorbing and regenerating characteristics than carefully prepared mixtures of a resin which contains only sulfonic functional groups and another resin which contains only carboxyl groups.

I claim:

1. A process for preparing an insoluble cation-exchange resin containing sulfonic acid groups and carboxyl groups as its functional, cation-adsorbing groups, which comprises sulfonating at a temperature from 0° to 60° C. and thereafter hydrolyzing an insoluble, cross-linked copolymer of a mixture of (a) a lower alkanol ester of an acid from the group consisting of acrylic and methacrylic acids, (b) a monovinyl hydrocarbon from the group consisting of styrene and vinyltoluene, and (c) a polyvinyl hydrocarbon, the ratio of said copolymerized ester to said copolymerized monovinyl hydrocarbon being from 5:5 to 3:7 on a molar basis, and said polyvinyl hydrocarbon being copolymerized in an amount equal to 3 to 15% on a molar basis.

2. A process for preparing an insoluble, cation-exchange resin containing sulfonic acid groups and carboxyl groups as its functional, cation-adsorbing groups, which comprises sulfonating at a temperature from 20° to 45° C. and thereafter hydrolyzing an insoluble, cross-linked copolymer of a mixture of (a) a lower alkanol ester of an acid from the group consisting of acrylic and methacrylic acids, (b) a monovinyl hydrocarbon from the group consisting of styrene and vinyltoluene, and (c) a polyvinyl hydrocarbon, the ratio of said copolymerized ester to said copolymerized monovinyl hydrocarbon being from 5:5 to 3:7 on a molar basis, and said polyvinyl hydrocarbon being copolymerized in an amount equal to 3 to 15% on a molar basis.

3. A process for preparing an insoluble, cation-exchange resin containing sulfonic acid groups and carboxyl groups as its functional, cation-adsorbing groups, which comprises sulfonating at a temperature from 20° to 45° C. and thereafter hydrolyzing an insoluble, cross-linked copolymer of a mixture of (a) ethylacrylate, (b) styrene, and (c) divinylbenzene, the ratio of said copolymerized ethylacrylate to said copolymerized styrene being from 5:5 to 3:7 on a molar basis and said divinylbenzene being copolymerized in an amount equal to 3 to 15% on a molar basis.

4. A process for preparing an insoluble, cation-exchange resin containing sulfonic acid groups and carboxyl groups as its functional, cation-adsorbing groups, which comprises sulfonating at a temperature from 20° to 45° C. and thereafter hydrolyzing an insoluble, cross-linked copolymer of a mixture of (a) methyl methacrylate, (b) styrene, and (c) divinylbenzene, the ratio of said copolymerized methyl methacrylate to said copolymerized styrene being from 5:5 to 3:7 on a molar basis and said divinylbenzene being copolymerized in an amount equal to 3 to 15% on a molar basis.

5. A process for preparing an insoluble, cation-exchange resin containing sulfonic acid groups and carboxyl groups as its functional, cation-adsorbing groups, which comprises sulfonating at a temperature from 20° to 45° C. and thereafter hydrolyzing an insoluble, cross-linked copolymer of a mixture of (a) methyl acrylate, (b) styrene, and (c) divinylbenzene, the ratio of said copolymerized methyl acrylate to said copolymerized styrene being from 5:5 to 3:7 on a molar basis and said divinylbenzene being copolymerized in an amount equal to 3 to 15% on a molar basis.

6. A process for preparing an insoluble, cation-exchange resin containing sulfonic acid groups and carboxyl groups as its functional, cation-adsorbing groups, which comprises sulfonating at a temperature from 20° to 45° C. and thereafter hydrolyzing an insoluble, cross-linked copolymer of a mixture of (a) ethyl methacrylate, (b) styrene, and (c) divinylbenzene, the ratio of said copolymerized ethyl methacrylate to said copolymerized styrene being from 5:5 to 3:7 on a molar basis and said divinylbenzene being copolymerized in an amount equal to 3 to 15% on a molar basis.

7. A process for preparing an insoluble, cation-exchange resin containing sulfonic acid groups and carboxyl groups as its functional, cation-adsorbing groups, which comprises sulfonating at a temperature from 20° to 45° C. and thereafter hydrolyzing an insoluble, cross-linked copolymer of a mixture of (a) ethylacrylate, (b) vinyltoluene, and (c) divinylbenzene, the ratio of said copolymerized ethylacrylate to said copolymerized vinyltoluene being from 5:5 to 3:7 on a molar basis and said divinylbenzene being copolymerized in an amount equal to 3 to 15% on a molar basis.

References Cited in the file of this patent

UNITED STATES PATENTS

| Number | Name | Date |
|---|---|---|
| 2,340,111 | D'Alelio | Jan. 25, 1944 |
| 2,366,007 | D'Alelio | Dec. 26, 1944 |
| 2,469,472 | Nachod | May 10, 1949 |
| 2,500,149 | Boyer | Mar. 14, 1950 |

OTHER REFERENCES

Topp, Jour. of The Chemical Society, December 1949, pages 3299–3303.